United States Patent [19]
Powell

[11] Patent Number: 5,863,207
[45] Date of Patent: Jan. 26, 1999

[54] PORTABLE RANDOM MEMBER SELECTOR

[76] Inventor: Timothy M. Powell, 9928 Courthouse Woods Ct., Vienna, Va. 22181

[21] Appl. No.: 689,064

[22] Filed: Jul. 30, 1996

[51] Int. Cl.$^6$ ..................................................... G09B 3/00
[52] U.S. Cl. ........................ 434/352; 364/717.01; 463/22
[58] Field of Search .................................... 434/201, 169, 434/352; 364/717.01–717.07, 710.03; 463/22, 16, 17, 18, 19, 20, 21

[56] References Cited

U.S. PATENT DOCUMENTS

| | | | |
|---|---|---|---|
| Re. 31,070 | 11/1982 | Meyer et al. . | |
| 3,190,014 | 6/1965 | Rhodes . | |
| 4,005,388 | 1/1977 | Morley et al. | 340/172.5 |
| 4,339,134 | 7/1982 | Macheel | 463/12 |
| 4,568,086 | 2/1986 | Krogh . | |
| 4,611,996 | 9/1986 | Stoner . | |
| 4,665,502 | 5/1987 | Kreisner | 364/900 |
| 4,692,863 | 9/1987 | Moosz | 364/412 |
| 4,713,787 | 12/1987 | Rapp | 364/717 |
| 4,755,140 | 7/1988 | Rimland | 434/236 |
| 4,811,247 | 3/1989 | Malady et al. | 364/550 |
| 4,842,276 | 6/1989 | Darby . | |
| 4,858,122 | 8/1989 | Kreisner | 364/410 |
| 4,891,775 | 1/1990 | McWherter | 364/705.06 |
| 5,050,881 | 9/1991 | Nagao | 463/21 |
| 5,204,671 | 4/1993 | Kronberg . | |
| 5,356,144 | 10/1994 | Fitzpatrick et al. | 273/138 |

*Primary Examiner*—Robert A. Hafer
*Assistant Examiner*—John Edmund Rovnak
*Attorney, Agent, or Firm*—Shlesinger Arkwright & Garvey LLP

[57] ABSTRACT

A portable device for selecting a member of a group at random, or, at the desire of the operator, for selecting each member of the group exactly once in random order, i.e., in random sequence. The device can also select members in sequence, without randomizing the order. The device stores multiple groups in its electronic memory so that the operator can use the device as an aid in several different settings, e.g., in the case of a teacher using the device with different classes of students.

17 Claims, 2 Drawing Sheets

PORTABLE RANDOM MEMBER SELECTOR

FIELD OF THE INVENTION

This invention relates to a device and a method for selecting a member of a group, particularly in situations in which an individual is facilitating or controlling a group of people, e.g., in classroom environment, wherein the individual decides to select members of the group at random, or in sequence, or in random sequence.

BACKGROUND OF THE INVENTION

A number of devices exist in the education and gaming fields, some of which use random or sequential selection of items or participants to be selected.

U.S. Pat. No. 4,611,996 to Stoner is applicable to the selection of a group member on demand by a group controller. However, Stoner's device does not mention keeping track of a random sequence of selections that ensures each group member is called on exactly once.

U.S. Pat. No. 4,842,276 to Darby discloses a game device for randomly selecting players.

U.S. Pat. No. 5,204,671 to Kronberg enables random sampling of items from a continuous series, such as during the movement of people past a country's customs booth.

None of the known prior art devices is capable of selecting members of a group in a variety of ways, including by random selection, and yet is small, easy to use, and adaptable to different requirements.

Accordingly, there is a need for a simple portable device that a teacher or game controller can use to select a member of a group at random, or to select each member of a group once in sequence, or to select each member of a group in a random sequence.

Especially in this age where great emphasis is placed on overcoming human bias in the classroom and other settings, a device according to the invention is an important contribution. Further, such an inventive device enables a teacher to adjust to different situations including random selection, sequential selection, or random sequence selection.

Throughout the specification, the meanings of the following terms is as follows:

"Selection at random" refers to selection of a member from a group in a purely random fashion; e.g., if there are five members in a group, the following selection could result from five members chosen in turn, for a total of ten turns: 3,1,5,5,4,2,1,4,4,3;

"Selecting a member in sequence" means that a predetermined selection sequence of a member of a group is followed: e.g., if one selected from a group of five members, for a total of ten turns, the followings sequence could result: 2,3,4,5,1,2,3,4,5,1; and "In random sequence" means that the order of selection of a member from a group is random, yet there is no repeated selection of a member from a group until each member of the group has been selected once; e.g., the following random sequence could result from selecting in random sequence from a group of five members, ten times: 5,3,2,4,1,5,3,2,4,1; in addition, it is contemplated that the sequence itself not be repeated, for example, when a member is chosen from a group of five members, for a total of ten turns, the following sequence could result: 4,3,2,5,1,3,2,5,4,1.

It will be appreciated that these are merely broad examples, and additional details of sequencing will be explained below.

OBJECTS AND SUMMARY OF THE INVENTION

It is therefore an object of the present invention to provide a device that enables the operator (e.g., a teacher) of the device to select a member (e.g., a student from a group) at random, in sequence, or in random sequence.

Another object of the invention is to provide a device that selects the name of each member of the group exactly once in random order.

A further object of the invention is to overcome the drawbacks of existing devices.

Yet another object of the invention is to provide a device of this type which can be used with the casing and keypads of a standard calculator or "pocket thesaurus", for example, and to reprogram it in accordance with the invention.

Another object of the invention is to provide a device to an instructor which is hand-held and light-weight, so as to be easily picked up by the instructor and placed in a pocket for ready use, and similar in size and appearance to a small electronic calculator.

Still another object of the invention is to provide a device which can be used in almost any setting, e.g., in a classroom where there is a need by the operator for aid in randomly selecting members.

Yet another object of this invention is to provide a computer which will permit by-pass of an individual and permit sequential, random, or random sequential selection of those listed in the computer.

A further object of this invention is to provide a device which permits the operator to input I.D.s or names of groups as well as individuals.

It is a further object of the invention to provide a device which includes an input mechanism to enter the names of groups and group members. The group names and members may be stored electronically so that they can be retrieved as needed.

According to a yet still further object of the invention, each group name and each member name is easily retrieved by the operator and the information can be viewed or changed.

It is another object of the invention to provide a device which also includes a method, typically fixed on a chip or implemented in software, provided on a floppy disk, or keyed in by the user, to keep track of the state of each group, i.e., which members have been selected, how many total members are in each group, and other data about the groups and members.

In accordance with a yet still further object of the invention, a device according to the invention may also include a mechanism to generate a random number between one and an arbitrary maximum that will be used to control the member selection.

According to another object of the invention, a method to manage the member selection and the display of the selection to the operator will be provided.

In accordance with a further object of the invention, a device according to the invention may also include a feature which enables the operator to skip a member of the group, i.e., to exempt a member from selection without deleting such member from the group. This feature would be useful, for example, in a classroom situation where one or more students are absent on a particular day.

DETAILED DESCRIPTION OF THE INVENTION

Figure 1:
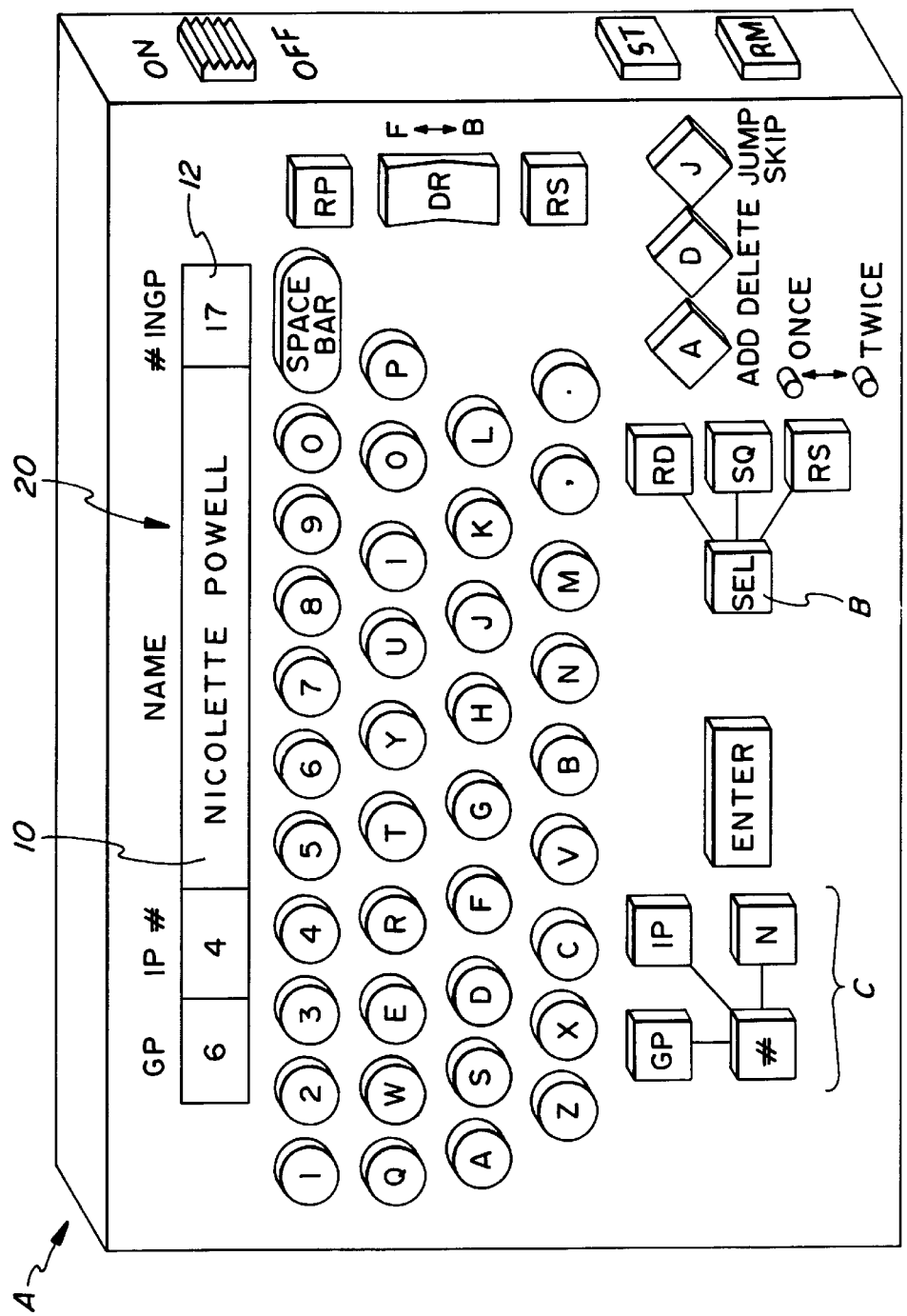
FIG. 1 is a possible layout of the display and entry pad according to a preferred embodiment of the present invention.

As shown in FIG. 1, a preferred embodiment of the present invention is a "hard-wired"/chip-controlled or software-controlled input and display device A shown in perspective view. Device A is similar in appearance to a hand-held calculator or "pocket thesaurus".

Conveniently, a conventional "ON/OFF" control in the form of a slide switch may be provided, as shown.

A select button B, labelled "SEL", is the initial button used by the operator to determine whether a random sequence is selected, whether a sequential sequence is selected, or whether each selection is completely random. Corresponding random selection, "RD", sequential sequence, "SQ", and random sequence, "RS", keys are operatively associated with the select button SL.

The name 10 of the selected member along with the information about how many total members 12 there are and how many have not yet been selected may be presented on display 20.

The number corresponding to the group in question is shown at location "GP" on display 20. The illustrated "6" in location "GP" may designate the 6th period of the day for a high school teacher, for example.

The display 20 location designated "#INGP" refers to the total count of individual group members, for example. The illustrated "17" in location "#INGP" indicates seventeen (17) students in a group designated "6" for example.

A particular person's number in the sequence is shown in the area of display 20 labelled "IP#."

The group of four (4) keys, collectively designated C, which may be considered the "mode," is used to determine if the operator wishes to pick one or many members of the group, i.e., whether the operator wishes to select an individual member of a group, or a group itself, with an identified person number key IP or with a group key GP, respectively.

The user is provided with a name button N which is actuated (e.g., depressed) when the name of a member of a group is to be entered. An "ENTER" key may conveniently be provided that the user depresses when the entry of a student's name is complete, for example.

A jump or skip key J provides for skipping a member when the member is absent, for example, without deleting the member from the group.

It is contemplated that a dedicated key be provided for activating a listing function which lists all members in a group sequentially (e.g., "scrolls" through all the members and displays the names on the display 20) and generates the names of members (students) or names of groups (classes) stored in the memory.

Alternatively, the illustrated direction button or control DR provides for displaying: the member next in the list, e.g., who is remaining in the list; and previous member(s), e.g., which of the members of the group has been selected earlier. Such can be accomplished by tilting or sliding the DR switch in the illustrated direction "F" for displaying members to be "selected" in a forward direction (i.e., remaining in the group) and, alternately, by tilting or sliding the DR switch in the illustrated direction "B" for displaying which group members have already been selected.

There may be an "editor" provided which adds or deletes the names of the members entered or sorted in the device by use of a respective add key A and delete key D, for example. In the illustrated device A, this will typically be a temporary "deletion," for example, when a member is temporarily not to be selected, as when a student is absent for a day.

To make device A even more user-friendly, there may be provided a separate, dedicated store "ST" key and remove "RM" key which store and remove, respectively, member's names or other data from the memory of device A.

It is likewise contemplated that the member selection sequence may be repeated twice, as indicated by a light-emitting diode, LED, labelled "TWICE," for example. The default mode of device A being the selection of each member once, as indicated by an accompanying LED labelled "ONCE."

Additional LEDs and displays corresponding to additional modes are anticipated.

It is likewise contemplated that there may be provided a separate, unillustrated, amend key for amending student names and numbers, for example. Alternately, it is contemplated that the delete key D be used for deleting the miskeyed in letters of a group member's name when the user is entering a name by use of key N.

Likewise, it will be appreciated that any of the above functions could be carried out through fewer, or even none, of the illustrated dedicated keys described above. It is expected that certain combinations of key strokes and letter combinations be used to control the device and carry out the desired functions without the need for separate function keys.

In addition, it is expected that all commands could be typed in a machine language or higher level language commands, such as achieved by the use of conventional personal computers (PCs) and computer software. This is contemplated to be the case whether or not the invention is carried out by the use of a hand-held device or other computer.

Figure 2:
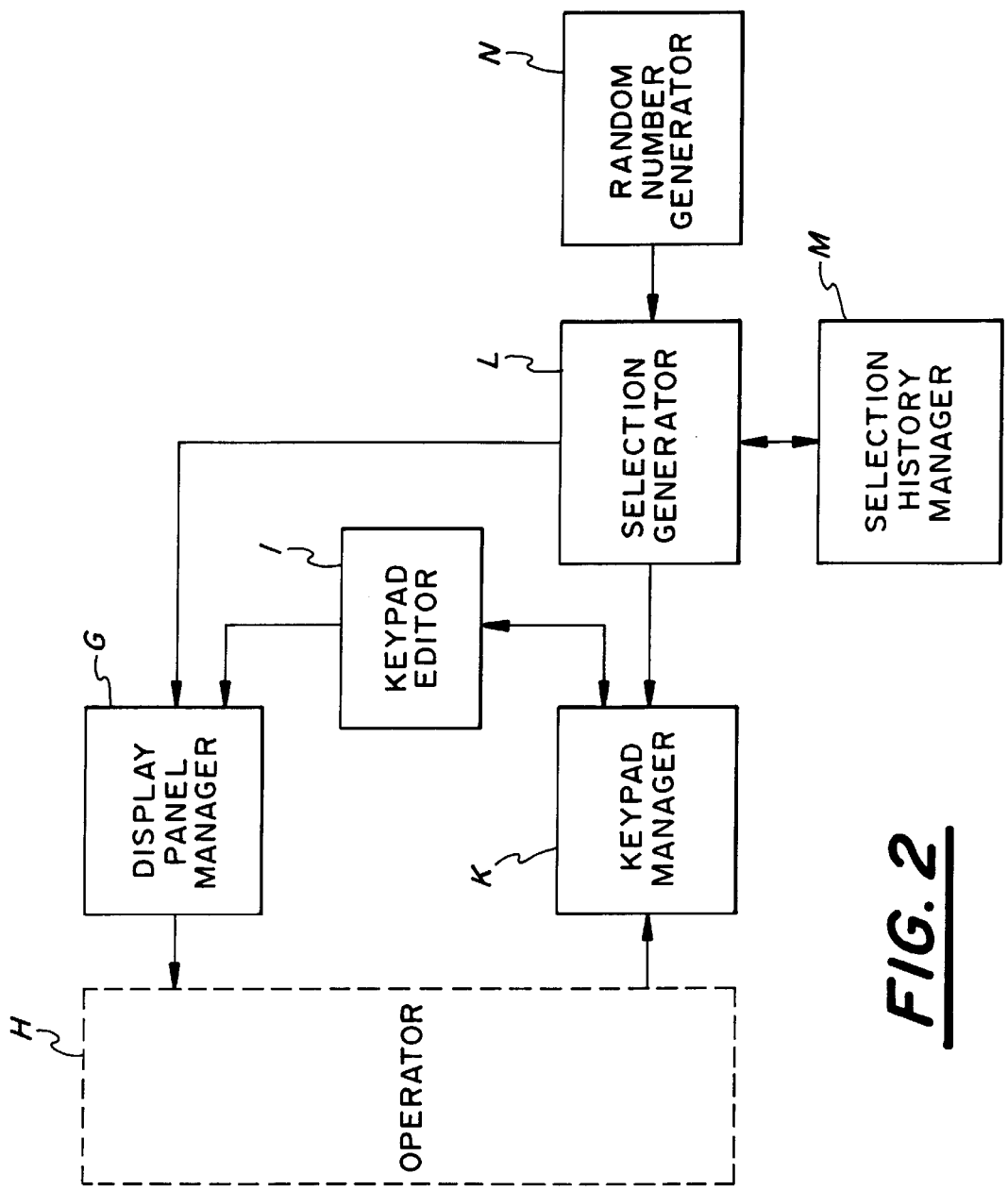
FIG. 2 is a block diagram of a preferred embodiment of functional architecture according to the invention.

FIG. 2 illustrates a preferred embodiment of the functional architecture of the device, as well as an overview of a method of carrying out the invention.

The operator H reads the display 20, which is controlled by a display panel manager G, and enters the desired selection mode, group member data, and request for next selection, for example.

A keypad manager K interprets the input and passes the data to a selection generator L. Selection generator L works with a selection history manager M and with the display panel manager G to organize the data and to present the data/current status to the operator by use of display 20 of the referred embodiment of FIG. 1, for example.

When the request for the next selection is received, a random number generator N provides a number to the selection generator L that is converted into the next member selection and displayed to the operator on display 20, for example. The keypad editor I works with the keypad manager K to enable the operator to edit a partially keyed input before it is passed on to the selection generator.

In a typical use of the device, the operator pre-loads first name 10 (e.g., "Nicolette Powell") of the names of the members of several groups using the illustrated alphanumeric key pad, which may be a conventional "QWERTY" keyboard, as shown in the three rows of twenty six (26) keys labelled A–Z, respectively, and a single row of keys labelled 1–10, respectively, in FIG. 1.

The display 20 preferably echoes back instructions to the operator before and after each name 10 is entered to ensure that the desired data has been entered and stored, in a preferred embodiment.

Once the names are entered, the operator now has the device set up for multiple uses, where each use is a request at the push of a button on the keypad for the next random selection. The operator has complete control through a choice of different buttons on the keypad, as to whether a random series is selected, i.e., one member at a time is selected from a group until each member has been chosen exactly once (the "random sequence") by use of key RS; as to whether each selection is completely random, i.e., a particular member of a group could randomly be chosen several times in a row by use of key RD; or as to whether the members are chosen sequentially, in an operator-determined non-sequential sequence, or by the conventional sequential selection of the second member of a group following the selection of the first member of the group (e.g., the first member is the member whose last name is alphabetically closest to the beginning of the alphabet) by use of the SQ key.

As to the use of key SQ in a standard sequence, the user initiates the sequence in the default mode of device A (e.g., student no. 1, assigned slot 1 and displayed in the IP# region of display 20. To begin with a student other than "no. 1," the user steps through the displayed students shown in display 20, until the desired starting student is reached, and that starting point is remembered by striking enter key E followed by store key ST, for example.

For each selection, the name of the selected member may be displayed on display 20 at location "NAME" along with information about how many members there are total at location 12, labelled "#INGP." It is contemplated that there be provided an additional location for displaying how many members of a group have not yet been selected.

The operator has the ability by pressing another button on the keypad to skip or "jump over" a member whom the operator does not want selected at that particular time but who should remain in the group to be available for selection at a later time; such is accomplished be actuating the J key. This skip over feature would be useful in a classroom situation where one or more students are absent on a particular day.

The device preferably continues to store all data including the state of each group even when the power switch is turned off.

The displaying of information may be by visual or auditory means, e.g., a display or speaker, respectively, or a combination thereof.

Furthermore, the device is able to keep track of multiple groups simultaneously so that, for example a professor could teach multiple classes each day and not lose track of which students were to be called upon in turn for the next day.

While this invention has been described as having a preferred design, it is understood that is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

What is claimed is:

1. A device for selecting a member of a group, comprising:

a) means provided for selecting a member of a group at random to yield a randomly selected member;

b) means provided for selecting a member of a group in random sequence, to yield a selected member;

c) means operably associated with the random member select in means and operably associated with the random sequence member selection means for determining which one thereof is in operation;

d) means provided for associating an alphanumeric name with at least one of the selected members;

e) means operatively associated with the determining means for displaying at least one of the selected members and the alphanumeric name to the operator of the device; and f) means provided for initiating said random selection means and said random sequence member selection means.

2. A device as recited in claim 1, wherein:

a) an electronic memory is provided; and b) means is provided to input a member of a group into the electronic memory, and to input data into the memory from the random member selection means, from the random sequence member selection means, and from the display means.

3. A device as recited in claim 1, wherein:

a) means is provided for generating a random number between the number 1 and arbitrary maximum number to yield a random number; and b) means is operably associated with the random number generating means for using the random number for selecting an "Nth" member of a group and for displaying the random number to the operator of the device, wherein the Nth member is the member associated with the random number.

4. A device as recited in claim 1, wherein:

a) means is provided for inputting an alphanumeric name.

5. A device recited in claim 1, wherein:

a) means is operatively associated with the determining means for skipping a member of the group.

6. A device as recited in claim 2, wherein:

a) a power switch is provided for turning the device on and off; and b) means is provided for storing data in said electronic memory when the power switch is off.

7. A device as recited in claim 2, wherein:

a) means is provided for associating a member name with each member;

b) means is provided for storing a plurality of member names;

c) means is provided for associating a stored member name with a discrete number; and d) means is provided for recalling and displaying a previously displayed one of the selected members.

8. A device as recited in claim 7, wherein:

a) means is provided for retrieving at least one of the member name and the discrete number associated with the member name for all members in a group.

9. A device as recited in claim 1, wherein:

a) a casing is provided; and b) the random member selection means, the random sequence member selection means, the determining means, the associating means, the display means, and the initiating means are disposed in said casing.

10. A device as recited in claim 1, wherein:

a) a keypad is provided; and b) said keypad is operatively associated with the initiating means.

11. A device as recited in claim 1, wherein:

a) the display means includes a display provided on said casing.

12. A device as recited in claim 9, wherein:

a) said casing is configured for being held in a human hand.

13. A device as recited in claim 1, wherein:

a) the display means includes a display;

b) said display is disposed on said casing; and c) said display is configured for presenting alphanumeric characters.

14. A device as recited in claim 1, wherein:

a) a computer is provided; and b) the random member selection means, the random sequence member selection means, the determining means, the associating means, the display means, and the initiating means are included in said computer.

15. A device as recited in claim 14, wherein:

a) said computer is programmed to select a sequence of predetermined numbers.

16. A device as recited in claim 14, wherein:

a) said computer is programmed to select a sequence of random numbers where there is no repeated selection of a number until each number is selected once.

17. A device as recited in claim 14, wherein:

a) said computer is a computer chip.

\* \* \* \* \*